Sept. 28, 1937.  S. M. NAMPA  2,094,407
CAR LOADING DEVICE
Filed Nov. 28, 1934
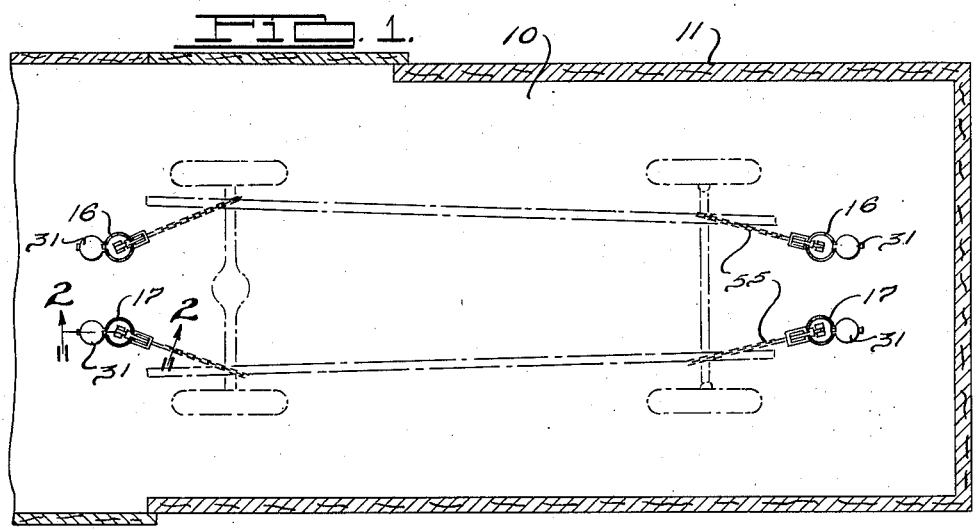
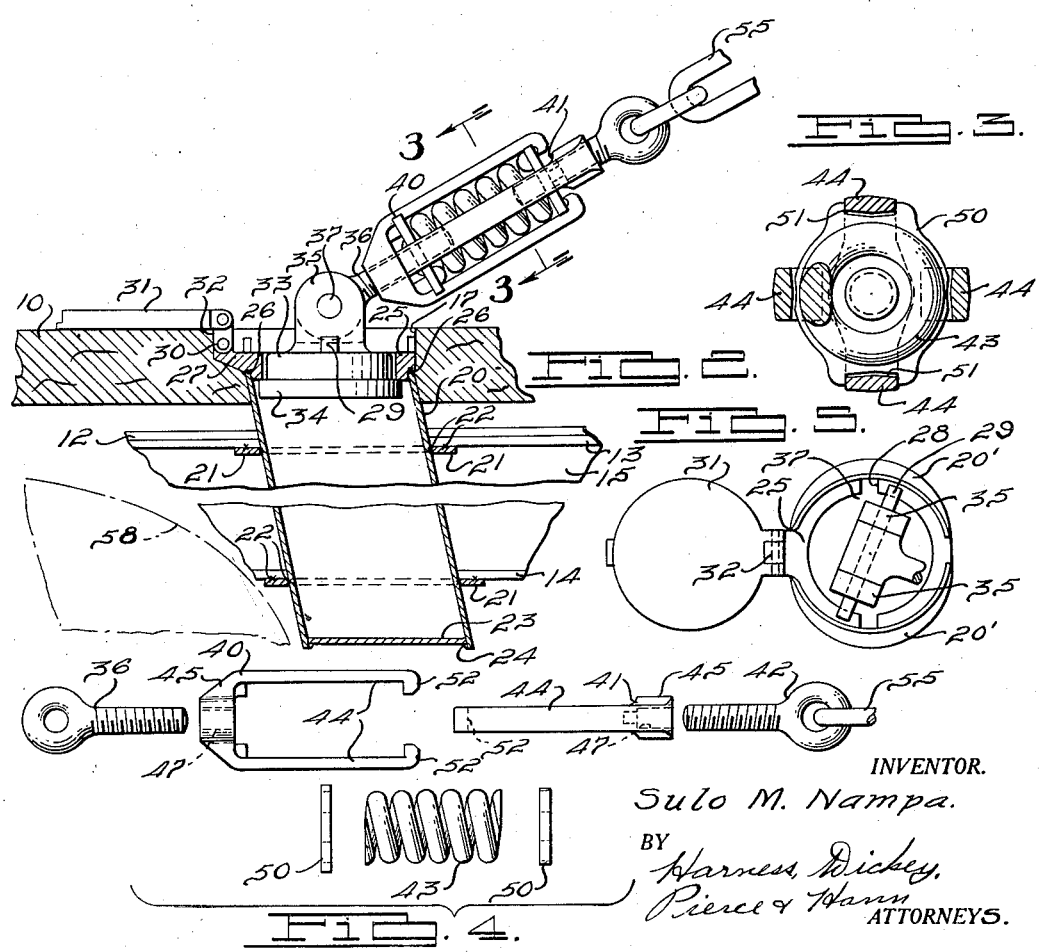
INVENTOR.
Sulo M. Nampa.
BY Harness Dickey,
Pierce & Hann
ATTORNEYS.

Patented Sept. 28, 1937

2,094,407

UNITED STATES PATENT OFFICE 2,094,407

CAR LOADING DEVICE

Sulo M. Nampa, Detroit, Mich., assignor to The Worth Company, a corporation of Michigan Application November 28, 1934, Serial No. 755,077

5 Claims. (Cl. 267—70)

This invention relates to car loading devices, and more especially to devices for anchoring a vehicle, such as an automobile, during transportation, to a freight car or equivalent carrier means.

In certain respects, the invention relates to a copending application of Samuel D. Butterworth, for car loading device, Serial No. 606,602, filed April 21, 1932, and assigned to the same assignee as is the present application.

Among the objects of the invention are: to provide improved means for securing a vehicle to a freight car, or the like; to provide securing or anchoring means of the above character which readily may be adjusted to take up slack and to exert a tensile force when attached to a vehicle; to provide an improved arrangement and construction of housing well for such anchoring device and disposed below the floor of the freight car, or equivalent carrier means, for housing the anchoring means when not in use for the purpose of securing a vehicle in position, the well or housing having sufficient clearance from trucks, air cylinders, accessories, and the like, arranged below the floor of the freight car or carrier means; to provide an anchoring means which embodies cushioning and adjusting means and which provides effective guide means for preventing buckling or misalignment of the cushioning means; and to provide anchoring means which requires little space, involves small expense to manufacture and install, which is rugged and efficient in preventing undesired movement of the anchored vehicle with respect to the freight car, or the like, and which is not readily disassembled so that the likelihood of pilferage or loss of anchoring units or parts thereof is reduced.

For the purpose of illustrating the genus of the invention, typical concrete embodiments are shown in the accompanying drawing, in which:

Fig. 1 is a longitudinal and horizontal section of a part of a freight car provided with vehicle anchoring devices constructed according to one form of the invention;

Fig. 2 is a cross section, on an enlarged scale, taken substantially on the line 2—2 of Fig. 1;

Fig. 3 is a section taken substantially on the line 3—3 of Fig. 2;

Fig. 4 is an exploded view of parts shown in Figs. 2 and 3;

Fig. 5 is a top plan of a modified form of well or housing means which may be employed for the reception of the anchoring means when not in use and for holding one end thereof when the latter is in working position.

Referring to the drawing, and more especially to Figs. 1 and 2, the numeral 10 indicates the floor of a freight car or equivalent carrier means, and the numeral 11 the side walls thereof. As indicated in Fig. 2, a structural metal beam 12 is arranged adjacent and below the floor 10. The beam 12 forms an integral part of or may be rigidly attached to the frame of the freight car or equivalent carrier means. In a freight car, the beam 12 may form one of the I-beams of a central longitudinally arranged box girder of the car frame. The beam 12 may be a channel or I-section and includes an upper flange 13 and a lower flange 14 connected by web 15.

The floor 10 is provided at longitudinally spaced points, as indicated in Fig. 1, with pairs of circular openings 16 and 17, the opening 16 being located at one side of the beam 12 and the opening 17 adjacent one side of a corresponding portion of another beam member. In the particular arrangement shown, four pairs of such openings are employed to a car, two pairs in each longitudinal half of the car or carrier means, it being understood that any desired number of pairs may be provided as desired. A housing well 20 of generally cylindrical form is arranged within each of the openings 16 and 17 and adjacent a beam 12 or similar part integral with or fixed to the frame of the freight car or the like. The housing wells 20 are rigidly fastened to the beams 12, or their equivalent, by means of strap elements 21 extending around the housing well and being welded thereto and to the flanges 13 and 14, as indicated at 22. The bottoms of the wells 20 are closed by bar or disc member 23 welded to the housing well as indicated at 24. An annular collar 25 is rigidly secured to the upper end of the housing well 20, as by being welded thereto as indicated at 26, the collar being provided with a laterally or radially extending lug 27 on which are provided the ears 30 to which a hinged lid 31 is pivotally connected through the intermediary links 32. The laterally projecting lug 27 will also serve as a stop for limiting downward movement of the well in positioning the same adjacent the beam member 12 when welding the stop element 21 to the housing well and to the flanges 15 and 14 of the beam member. A suitable recess is cut in the flooring end for the reception of the laterally projecting lug 27, the recess extending to a position in the floor 10 so that when the hinge lid 31 is in closed position, the top surface of the lid 31 lies substantially flush with the upper surface of the flooring 10.

Each well 20 houses a reciprocatory anchoring element 33 having an annular rib 34 loosely fitting within the bore of the well 20. The annular rib 34 is adapted to contact the bottom end surface of the collar element 25 to limit upward movement of the anchoring element 33 within the well 20. The upper surface of the anchoring element 33 is provided with a pair of ears 35 arranged in spaced relation so that an eye bolt 36 may be pivotally connected to the anchoring element 33 by means of a pin 37 extending laterally through the eye portion of such bolt and suitable apertures provided in the ears 35.

The eye bolt 36 forms one element of an adjustable, resilient connection extending between suitable vehicle engaging means and the anchoring element 33. This adjustable, resilient connection may be in the form of the construction shown in the co-pending application of Leo I. Friedlaender, Serial No. 580,380, filed December 11, 1931, but preferably includes a pair of U-shaped frames 40 and 41, a second eye bolt 42 and a resilient element in the form of a coil spring 43. Referring more particularly to Figs. 2, 3, and 4, it will be noted that each of the U-shaped frames 40 or 41 includes leg portions 44 and a bearing portion 45 connecting such leg portions and provided with a threaded aperture 47 into which the eye bolt elements 36 or 42 are threaded. The eye bolts are provided with right and left hand threads, respectively, so as to effect the desired adjustment of the resilient connection. This connection is assembled by threading the eye bolts 36 and 42 through the apertures 47 of frame members 40 and 41 and then peaning over the ends of the threaded portion of the eye bolts so as to effect a permanent assembly of one of the eye bolts to each of the frame members. A pair of disc or washer elements 50, of the form shown in Fig. 9, each being diametrically enlarged and provided with a notch 51 at each side thereof, are assembled within the legs 44 of the frame elements 40 and 41 and the resilient element 43 placed within one of the frame elements. The legs 44 of the other frame element are then spread slightly so that this frame may be slid endwise over the spring 43 and the legs of both frames are then spread slightly until inturned ends 52 at the free ends of the leg portions 44 of each frame may be slipped over the washer 50 with the leg portions 44 extending through the notches 51 in said disc or washer elements. The ends 52 of each frame member are then welded to one of the washers 50 at points at 90 degrees from the notches 51 to complete the adjustable, resilient connection. It will be noted that with the frame assembled as indicated in Fig. 2, the leg portions 44 of frames 40 and 41 fit comparatively closely to the outside periphery of the spring 43 so as to prevent buckling of the spring during extension of the resilient, adjustable connection. The four legs 44 of the frames 40 and 41 are arranged closer to the outside periphery of the coil spring 43 than is the outside periphery of the threaded portions of the eye bolts 36 and 42, so that any buckling of the coil spring is limited by the guide portions so that the spring cannot interfere or rub against the threads of the eye bolt so as to injure the threads and interfere with the adjustment of the resilient connection. It will be noted, on inspection of Fig. 3, that the leg portions 44 are disposed every 90 degrees about the periphery of the coil spring 43 so that no material amount of buckling of this spring can occur in any lateral direction during extension of the resilient connection. With the inturned end portions 52 welded to the washers 50 and the ends of the eye bolts 36 and 42 peaned over, the connection becomes permanently assembled so that parts thereof cannot readily be lost or subject to theft.

Referring back to Fig. 2, it will be noted that the well 20 may be arranged with its axis at an angle other than 90 degrees with respect to the plane of the floor 10. This is particularly desirable when the opening 17 is arranged above an accessory, such as an air tank 58, indicative of any accessory disposed below the floor of the freight car in such a position that it would interfere with the placement of a well 20 having its axis arranged normal to the plane of the floor 10 while maintaining proper centers of the well openings 16 or 17 in the floor 10. A chain 55 or other vehicle-engaging means is connected to the eye bolt 42 and is adapted to be secured to the axle or other desired part of the vehicle to be shipped. By arranging the well 20 with its axis at an angle other than 90 degrees with respect to the plane of the floor, the well 20 may have the same capacity for holding the anchoring element 33, the resilient, adjustable connection, including eye bolts 36 and 42, frames 40 and 41, and the resilient element 43, as well as the vehicle-engaging chain 55. These elements may be lowered within the well 20 when not in use in securing a vehicle in position within a freight car or the like.

In assembling the well 20 with reference to the floor 10 of the freight car and in assembling the anchoring element 33, the resilient connection and the vehicle-engaging means 55 with the cover 31 assembled thereto, is first welded to the tubular portion of the well 20 and then this assembly is slipped downwardly through an opening 16 or 17. The element 25 acts thus to position the well 20 properly so that the latter may be welded by means of a strap 21 to the frame member 12 without manually supporting the well 20 while the welds 22 are effected. The vehicle engaging means 55, the adjustable, resilient connection, including the frames 40 and 41, the resilient element 43, and the eye bolts 36 and 42, and the anchoring element 33 are then slipped upwardly through the bottom of the tubular portion of the well 20 and the bottom cover plate 23 welded to the bottom of such tubular portion, as indicated at 24. This construction and assembly of the above described elements prevents pilferage or loss of parts of the vehicle hold down means.

Reference may now be had to Fig. 5, in which a slightly modified form of well 20' is disclosed. This well differs from that indicated at 20 in Fig. 2 in that the well is enlarged and of oval section in order to maintain the desired capacity of the well but at the same time decreasing its effective vertical height. This type of well construction is employed over axles or other parts or accessories disposed below the level of the floor 10 and in alignment with properly centered floor openings 16 and 17. It will be noted that both of these embodiments of wells indicated in Figs. 2 and 5 have a decreased vertical height as compared with a cylindrical well of similar capacity having its axis disposed normally with respect to the plane of the floor 10. When the vehicle hold-down means is not in use, it is lowered within a well 20 or 20' and the cover 31 of such well closed so that the upper surfaces thereof lie substantially flush with the upper surface of the floor 10. The annular collar member 25 is preferably provided with diametrically opposed grooves 28 through which outwardly projecting lugs 29 formed on anchoring element 33 may pass so that the anchoring element, when desired, may be rotated to maintain it in an elevated position, as indicated in Figs. 2 and 5.

As many changes could be made in the above described construction and many apparently widely different embodiments of this invention could be had without departing from the spirit thereof, it is intended that any matter concerned in the above description or shown in the accompanying drawing shall be interpreted as illustrative and not in a limiting sense.

What is claimed is:

1. Apparatus for anchoring a vehicle to a freight car comprising a pair of U-shaped metal frame members, each having side portions terminating at one end in a joining portion, a second joining portion for the other end of each frame member and in the form of a disc provided with a central opening and with a pair of grooves arranged at diametrically opposite points on said disc with respect to said central opening for slidably receiving the side portions of the other frame member, a compression spring arranged between the side portions of both frame members and abutting at each end thereof, the inner face of one of said discs, and a pair of attaching members, each rotatably connected to one of the first-named joining portions of one of said frame members, at least one of said attaching members being threadedly connected to one of the joining members for adjusting the effective length of the anchoring apparatus upon rotation of the U-shaped frame members relative to said attaching members and adapted to project through the central opening of the disc of the other frame member with such compression spring in expanded condition.

2. Apparatus for anchoring a vehicle to a freight car comprising a pair of U-shaped frame members each having side portions terminating at one end in a joining portion, a second joining portion for the other end of each frame member and in the form of a disc welded to the side portions of one of said frame members and provided with a central opening, said discs each being provided with grooves arranged at diametrically opposite points with respect to said central openings for slidably receiving the side portions of the other frame member, a compression spring disposed between the side portions of both frame members and abutting at each end thereof the inner faces of one of said discs, and a pair of oppositely threaded attaching members each threadedly connected to one of the first-named joining portions of said frame member.

3. Apparatus for anchoring a vehicle to a freight car comprising a pair of U-shaped frame members each having side portions terminating at one end in a joining portion provided with a threaded aperture extending longitudinally of the frame member, a second joining portion for the other end of each frame member and in the form of a disc welded to inturned end portions provided at the free ends of the side portions of said frame member, said discs each being provided with a central opening and diametrically opposed grooves for slidably receiving the side portions of the other frame member, a compression spring disposed between the side portions of both frame members and abutting at the ends thereof the inner faces of said discs, and a pair of oppositely threaded attaching members each threadedly engaging the apertures in said first-named joining portions of said frame members.

4. Apparatus for anchoring a vehicle to a freight car comprising a pair of U-shaped frame members each having side portions terminating at one end in a joining portion provided with a threaded aperture extending longitudinally of the frame member, a second joining portion for the other end of each frame member and in the form of a disc welded to inturned end portions provided at the free ends of the side portions of said frame member, said discs each being provided with a central opening and diametrically opposed grooves for slidably receiving the side portions of the other frame member, a compression spring disposed between the side portions of both frame members and abutting at the ends thereof the inner faces of said discs, and a pair of oppositely threaded attaching members each provided with a bolt portion threaded through the apertures in said first-named joining portions of said frame members, the inner ends of said bolt portions being headed to prevent disassembly of the attaching members from said frame members.

5. Apparatus for anchoring a vehicle to a freight car comprising a pair of U-shaped frame members, each having side portions terminating in a joining portion, a second joining portion for the other end of each frame member and in the form of a disc welded to the side portions of one of the frame members, said discs each being provided with a central opening and with diametrically opposed grooves for slidably receiving the side portions of the other frame member, a compression spring disposed between the side portions of both frame members and abutting at each end thereof the inner face of one of said discs, and a pair of oppositely threaded attaching members each threadedly connected to one of the first-mentioned joining portions of said frame members, said spring being spaced farther from said attaching members than from the side portions of said frame members.

SULO M. NAMPA.